(12) United States Patent  
Sapp et al.

(10) Patent No.: US 8,887,051 B2  
(45) Date of Patent: *Nov. 11, 2014

(54) POSITIONING A VIRTUAL SOUND CAPTURING DEVICE IN A THREE DIMENSIONAL INTERFACE

(71) Applicant: Apple Inc., Cupertino, CA (US)

(72) Inventors: Markus Sapp, Appen-Etz (DE); Kerstin Heitmann, Hamburg (DE); Thorsten Quandt, Hamburg (DE); Manfred Knauff, Hamburg (DE); Marko Junghanns, Barmstedt (DE)

(73) Assignee: Apple Inc., Cupertino, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/692,145

(22) Filed: Dec. 3, 2012

(65) Prior Publication Data

US 2013/0097511 A1     Apr. 18, 2013

Related U.S. Application Data

(63) Continuation of application No. 12/505,958, filed on Jul. 20, 2009, now Pat. No. 8,327,269.

(51) Int. Cl.  
    *G06F 3/16*      (2006.01)

(52) U.S. Cl.  
    USPC ........................................ 715/728; 715/727

(58) Field of Classification Search  
    USPC ......................... 715/727, 704, 757, 848, 852  
    See application file for complete search history.

(56) References Cited

U.S. PATENT DOCUMENTS 5,214,615 A     5/1993    Bauer

OTHER PUBLICATIONS

Overloud Products, Overview and Sound-Professional Audio Tools, "TH1 Advanced DSP Technologies," www.overloud.com, Overloud, a division of ALMATEQ srl, Modena, Italy, copyright 2007 (Available at http://www.overloud.com/en/products/th1/?itemid=131, last visited Jul. 16, 2009), 4 pages.  
Softube, "Metal Amp Room User's Guide," Softube AB, Linkoping, Sweden, copyright 2008 (Available at http://www.softube.com/metal_amp_room/Metal%20Amp%20Room%20Manual.pdf, last visited on Jul. 16, 2009), 24 pages.  
Apple manual, "Logic Studio Instruments and Effects," Apple Inc., Cupertino, California, copyright 2007 (Available at http://manuals.info.apple.com/en/Logic_Studio_Instruments_and_Effects.pdf, last visited on Jul. 16, 2009), 668 pages.  
Globe Audio Recording and Production Classes, Globe Institute of Recording & Production, "The Virtual Mixer," http://web.archive.org/web/20070801172836/http://www.globerecording.com/virtualmixer/vm.html, last visited on Jan. 17, 2012, 6 pages.

*Primary Examiner* — Weilun Lo  
*Assistant Examiner* — Peiyong Weng  
(74) *Attorney, Agent, or Firm* — Fish & Richardson P.C.

(57) ABSTRACT

A method, system, and computer-readable product for positioning a virtual sound capturing device in a graphical user interface (GUI) are disclosed. The method includes displaying a virtual sound capturing device in relation to a virtual sound producing device in a three dimensional interface and in a two dimensional graphical map. Additionally, the method includes adjusting the display of the virtual sound capturing device in relation to the virtual sound producing device in both the three dimensional interface and the two dimensional graphical map in response to commands received from an input device.

20 Claims, 4 Drawing Sheets

POSITIONING A VIRTUAL SOUND CAPTURING DEVICE IN A THREE DIMENSIONAL INTERFACE

CROSS-REFERENCE TO RELATED APPLICATIONS

This application is a continuation application of and claims priority to U.S. application Ser. No. 12/505,958, filed on Jul. 20, 2009, the entire disclosure of which is incorporated herein by reference.

FIELD

The following relates to computing devices capable of and methods for arranging music, and more particularly to algorithms for virtually positioning and repositioning of a virtual sound capturing device using a digital audio workstation.

BACKGROUND

Artists can use software to create musical arrangements. This software can be implemented on a computer to allow an artist to write, record, edit, and mix musical arrangements. Typically, such software can allow the artist to arrange files on musical tracks in a musical arrangement. A computer that includes the software can be referred to as a digital audio workstation (DAW). The DAW can display a graphical user interface (GUI) to allow a user to manipulate files on tracks. The DAW can display each element of a musical arrangement, such as a guitar, microphone, or drums, on separate tracks. For example, a user may create a musical arrangement with a guitar on a first track, a piano on a second track, and vocals on a third track. The DAW can further break down an instrument into multiple tracks. For example, a drum kit can be broken into multiple tracks with the snare, kick drum, and hi-hat each having its own track. By placing each element on a separate track a user is able to manipulate a single track, without affecting the other tracks. For example, a user can adjust the volume or pan of the guitar track, without affecting the piano track or vocal track. As will be appreciated by those of ordinary skill in the art, using the GUI, a user can apply different effects to a track within a musical arrangement. For example, volume, pan, compression, distortion, equalization, delay, and reverb are some of the effects that can be applied to a track.

Typically, a DAW works with two main types of files: MIDI (Musical Instrument Digital Interface) files which can contain MIDI data and audio files which can contain audio data. MIDI is an industry-standard protocol that enables electronic musical instruments, such as keyboard controllers, computers, and other electronic equipment, to communicate, control, and synchronize with each other. MIDI does not transmit an audio signal or media, but rather transmits "event messages" such as the pitch and intensity of musical notes to play, control signals for parameters such as volume, vibrato and panning, cues, and clock signals to set the tempo. As an electronic protocol, MIDI is notable for its widespread adoption throughout the industry.

Using a MIDI controller coupled to a computer, a user can record MIDI data into a MIDI track. Using the DAW, the user can select a MIDI instrument that is internal to a computer and/or an external MIDI instrument to generate sounds corresponding to the MIDI data of a MIDI track. The selected MIDI instrument can receive the MIDI data from the MIDI track and generate sounds corresponding to the MIDI data which can be produced by one or more monitors or speakers. For example, a user may select a piano software instrument on the computer to generate piano sounds and/or may select a tenor saxophone instrument on an external MIDI device to generate saxophone sounds corresponding to the MIDI data. If MIDI data from a track is sent to an internal software instrument, this track can be referred to as an internal track. If MIDI data from a track is sent to an external software instrument, this track can be referred to as an external track.

Audio files are recorded sounds. An audio file can be created by recording sound directly into the system. For example, a user may use a guitar to record directly onto a guitar track or record vocals, using a microphone, directly onto a vocal track. As will be appreciated by those of ordinary skill in the art, audio files can be imported into a musical arrangement. For example, many companies professionally produce audio files for incorporation into musical arrangements. In another example, audio files can be downloaded from the Internet. Audio files can include guitar riffs, drum loops, and any other recorded sounds. Audio files can be in sound digital file formats such as WAV, MP3, M4A, and AIFF. Audio files can also be recorded from analog sources, including, but not limited to, tapes and records.

In live audio recording, differences in the positioning of a sound capturing device, such as a microphone, in relation to a sound producing device, such as a speaker, a musical instrument, and/or a singer, create differences in the attributes in a recording. For instance, a microphone positioned further away from a singer picks up a more natural representation of the singer's head and chest resonances. Additionally, extraneous sounds such as lip noises dissipate more quickly than the more resonant aspects of the voice as distance from the source increases. In virtual sound recording it is desirable to mimic the same effects by positioning a virtual sound capturing device with respect to a virtual sound producing device.

SUMMARY

As introduced above, users may desire to adjust the positioning of a virtual sound capturing device in relation to a virtual sound producing device in a three dimensional interface. Therefore, disclosed are methods, systems, and computer program products for virtually positioning a sound capturing device in a graphical user interface (GUI). The method includes displaying a virtual sound capturing device or a representation of a virtual sound capturing device in relation to a virtual sound producing device or a representation of a virtual sound producing device in a three dimensional interface and in a two dimensional graphical map. Additionally, the method includes adjusting a position of the virtual sound capturing device in relation to a position of the virtual sound producing device in both the three dimensional interface and the two dimensional graphical map in response to commands received from an input device. Based on the type and position of the virtual sound producing device and type and position of the virtual sound capturing device, a processor can adjust an associated algorithm that produces sound based on specifications associated with the model of the virtual sound capturing device and a model of the virtual sound producing device.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The functions described as being performed at various components can be performed at other components, and the various components can be combined and/or separated. Other modifications also can be made.

Thus, the following disclosure ultimately will describe systems, computer readable media, devices, and methods for positioning a virtual sound producing device in a three dimensional interface. Many other examples and other characteristics will become apparent from the following description.

Figure 1:
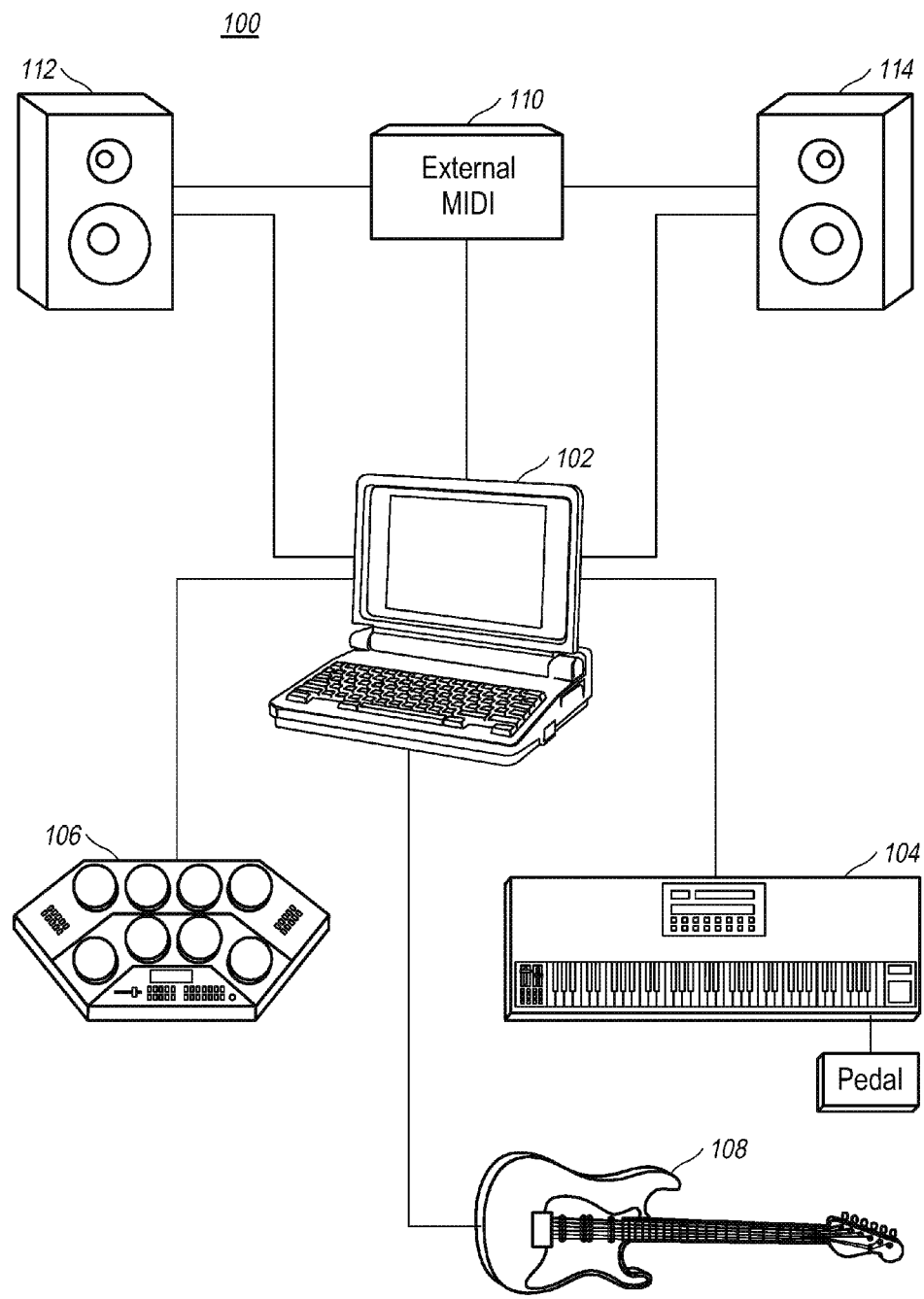
FIG. 1 depicts a block diagram of a system having a DAW musical arrangement in accordance with an exemplary embodiment.

Referring to FIG. 1, a block diagram of a system including a DAW in accordance with an exemplary embodiment is illustrated. As shown, the system 100 can include a computer 102, one or more sound output devices 112, 114, one or more MIDI controllers (e.g. a MIDI keyboard 104 and/or a drum pad MIDI controller 106), one or more instruments (e.g. a guitar 108, and/or a microphone (not shown)), and/or one or more external MIDI devices 110. As would be appreciated by one of ordinary skill in the art, the musical arrangement can include more or less equipment as well as different musical instruments.

The computer 102 can be a data processing system suitable for storing and/or executing program code, e.g., the software to operate the GUI which together can be referred to as a, DAW. The computer 102 can include at least one processor, e.g., a processor, coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, the computer 102 can be a desktop computer or a laptop computer.

A MIDI controller is a device capable of generating and sending MIDI data. The MIDI controller can be coupled to and send MIDI data to the computer 102. The MIDI controller can also include various controls, such as slides and knobs, which can be assigned to various functions within the DAW. For example, a knob may be assigned to control the pan on a first track. Also, a slider can be assigned to control the volume on a second track. Various functions within the DAW can be assigned to a MIDI controller in this manner. The MIDI controller can also include a sustain pedal and/or an expression pedal. These can affect how a MIDI instrument plays MIDI data. For example, holding down a sustain pedal while recording MIDI data can cause an elongation of the length of the sound played if a piano software instrument has been selected for that MIDI track.

As shown in FIG. 1, the system 100 can include a MIDI keyboard 104 and/or a drum pad controller 106. The MIDI keyboard 104 can generate MIDI data which can be provided to a device that generates sounds based on the received MIDI data. The drum pad MIDI controller 106 can also generate MIDI data and send this data to a capable device which generates sounds based on the received MIDI data. The MIDI keyboard 104 can include piano style keys, as shown. The drum pad MIDI controller 106 can include rubber pads. The rubber pads can be touch and pressure sensitive. Upon hitting or pressing a rubber pad, or pressing a key, the MIDI controller (104,106) generates and sends MIDI data to the computer 102.

An instrument capable of generating electronic audio signals can be coupled to the computer 102. For example, as shown in FIG. 1, an electrical output of an electric guitar 108 can be coupled to an audio input on the computer 102. Similarly, an acoustic guitar 108 equipped with an electrical output can be coupled to an audio input on the computer 102. In another example, if an acoustic guitar 108 does not have an electrical output, a microphone positioned near the guitar 108 can provide an electrical output that can be coupled with an audio input on the computer 102. The output of the guitar 108 can be coupled to a pre-amplifier (not shown) with the pre-amplifier being coupled to the computer 102. The pre-amplifier can boost the electronic signal output of the guitar 108 to acceptable operating levels for the audio input of computer 102. If the DAW is in a record mode, a user can play the guitar 108 to generate an audio file. Popular effects such as chorus, reverb, and distortion can be applied to this audio file when recording and playing.

The external MIDI device 110 can be coupled to the computer 102. The external MIDI device 110 can include a processor e.g., a second processor which is external to the processor 102. The external processor can receive MIDI data from an external MIDI track of a musical arrangement to generate corresponding sounds. A user can utilize such an external MIDI device 110 to expand the quality and/or quantity of available software instruments. For example, a user may configure the external MIDI device 110 to generate electric piano sounds in response to received MIDI data from a corresponding external MIDI track in a musical arrangement from the computer 102.

The computer 102 and/or the external MIDI device 110 can be coupled to one or more sound output devices (e.g., monitors or speakers). For example, as shown in FIG. 1, the computer 102 and the external MIDI device 110 can be coupled to a left monitor 112 and a right monitor 114. In one or more embodiments, an intermediate audio mixer (not shown) may be coupled between the computer 102, or external MIDI device 110, and the sound output devices, e.g., the monitors 112, 114. The intermediate audio mixer can allow a user to adjust the volume of the signals sent to the one or more sound output devices for sound balance control. In other embodiments, one or more devices capable of generating an audio signal can be coupled to the sound output devices 112, 114. For example, a user can couple the output from the guitar 108 to the sound output devices.

The one or more sound output devices can generate sounds corresponding to the one or more audio signals sent to them. The audio signals can be sent to the monitors 112, 114 which can require the use of an amplifier to adjust the audio signals to acceptable levels for sound generation by the monitors 112, 114. The amplifier in this example may be internal or external to the monitors 112, 114.

Although, in this example, a sound card is internal to the computer 102, many circumstances exist where a user can utilize an external sound card (not shown) for sending and receiving audio data to the computer 102. A user can use an external sound card in this manner to expand the number of available inputs and outputs. For example, if a user wishes to record a band live, an external sound card can provide eight (8) or more separate inputs, so that each instrument and vocal can each be recorded onto a separate track in real time. Also, disc jockeys (djs) may wish to utilize an external sound card for multiple outputs so that the dj can cross-fade to different outputs during a performance.

Figure 2:
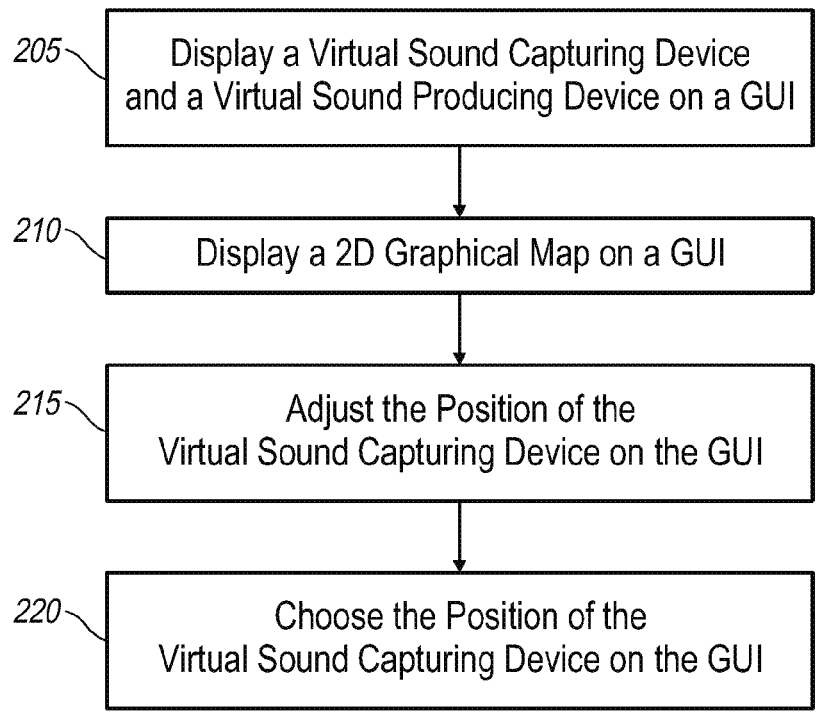
FIG. 2 is a flow chart of a method for adjusting the positioning of a virtual sound capturing device in relation to a virtual sound producing device in a three dimensional interface in accordance with an exemplary embodiment.

Referring to FIG. 2, a flow chart of a method for adjusting the positioning of a virtual sound capturing device in relation to a virtual sound producing device in a three dimensional interface in accordance with an exemplary embodiment is illustrated. The exemplary method 200 is provided by way of example, as there are a variety of ways to carry out the method. In one or more embodiments, the method 200 is performed by the computer 102 of FIG. 1. The method 200 can be executed or otherwise performed by one or a combination of various systems. The method 200 described below can be carried out using the devices illustrated in FIG. 1 by way of example, and various elements of this figure are referenced in explaining exemplary method 200. Each block shown in FIG. 200 represents one or more processes, methods or subroutines carried out in exemplary method 200. The exemplary method 200 can begin at block 205.

At block 205, a virtual sound capturing device and a virtual sound producing device in a three dimensional (3D) interface are displayed. For example, the processor or a display module of the computer 102 can cause the display device of computer 102 to display a 3D image showing a virtual sound capturing device and a virtual sound producing device.

Figure 3:
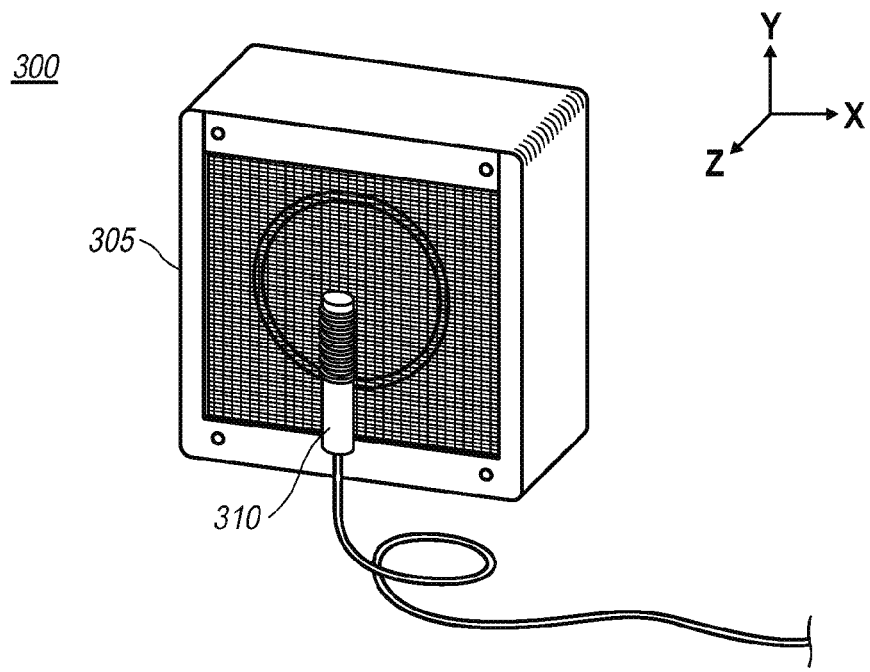
FIG. 3 depicts a screenshot of a GUI of a DAW displaying a virtual sound capturing device and a virtual sound producing device in accordance with an exemplary embodiment.

FIG. 3 is a screen shot 300 of a portion of a GUI showing a virtual sound producing device 305 and a virtual sound capturing device 310. As can be seen in FIG. 3, the processor or display module can cause the display device to display a 3D user interface. Thus, virtual sound producing device 305 and virtual sound capturing device 310 can be virtually positioned adjacent to each other within the 3D user interface at any point within the 3D space.

While virtual sound producing device 305 is shown as a speaker, any sound producing device can be represented, for example a musical instrument or a singer. Furthermore, for each type of sound producing device that can be represented, certain attributes of the virtual sound producing device can be altered to mimic the actual device. For instance, specific speakers can be modeled and represented to produce desired effects in the output of a virtual recording.

While virtual sound capturing device 310 is shown as a microphone, any sound capturing device can be represented, such as a gramophone. Furthermore, for each type of sound capturing device that can be represented, certain attributes of the virtual sound capturing device can be altered to mimic the actual device. For instance, specific microphones can be modeled and represented to produce desired effects in the output of a virtual recording.

Based on the choice of the virtual sound producing device and choice of the virtual sound capturing device, the processor or processing module can adjust the algorithm that generates sound based on specifications associated with the model of the virtual sound capturing device and a model of the virtual sound producing device. For example, using a drop down menu the user can select a model of a specific sound capturing device and/or select a model of a specific sound capturing device. In response to the selection, the processor or processing module can adjust at least one attribute, for example reverb, resonance, or pitch, in the recording of the audio file.

Returning to FIG. 2, at block 210, a two dimensional (2D) graphical map is displayed on the GUI. For example, the processor or display module can cause the display device to display a 2D image of a graphical map. While graphical map includes a top down view of the virtual position of the virtual sound producing device in relation to the virtual position of the virtual sound capturing device, any 2D view of the virtual spatial relationship between the two devices can be shown. The processor or display module can cause the display device to display the graphical map upon a command received via the input device of computer 102. For example, a user can utilize the input device, e.g. a mouse, to click on a portion of the GUI or scroll over a portion of the GUI and the processor or display module can register the action and cause the display device to display the graphical map.

Figure 4:
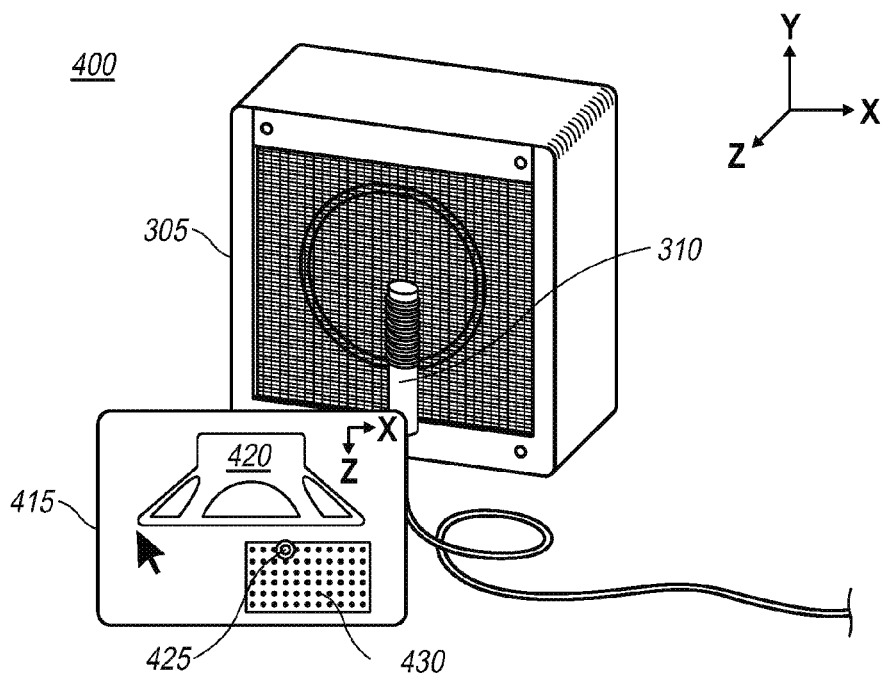
FIG. 4 depicts a screenshot of a GUI of a DAW displaying a virtual sound capturing device, a virtual sound producing device in accordance with an exemplary embodiment, and a graphical map in accordance with an exemplary embodiment.

FIG. 4 is a screen shot 400 of a portion of the GUI showing the virtual sound producing device 305 and the virtual sound capturing device 310, from FIG. 3, with a graphical map 415 depicting a top down view of the top of virtual sound producing device 420 and the top of virtual sound capturing device 425. Additionally, the graphical map 415 can include a grid 430 of possible positions for the top of virtual sound capturing device 425 to be placed.

Returning to FIG. 2, at block 215, the position of the virtual sound capturing device is adjusted. For example, in response to a command received via the input device, e.g., a mouse, the processor or processor module causes the display device to show the virtual sound capturing device moving about the GUI. The processor or display module can cause the display device to show the virtual sound capturing device moving in both the 3D user interface and the 2D graphical map. The commands received via the input device can be in response to the input device moving the virtual sound capturing device in the 2D graphical map. For example, a user can select the virtual sound capturing device in the 2D graphical map and move the virtual sound capturing device about the 2D graphical map. In response to the action of the user, the processor or display module can cause the display device to show the virtual sound capturing device moving about the 3D user interface in accordance with the action of the user.

Figure 5:
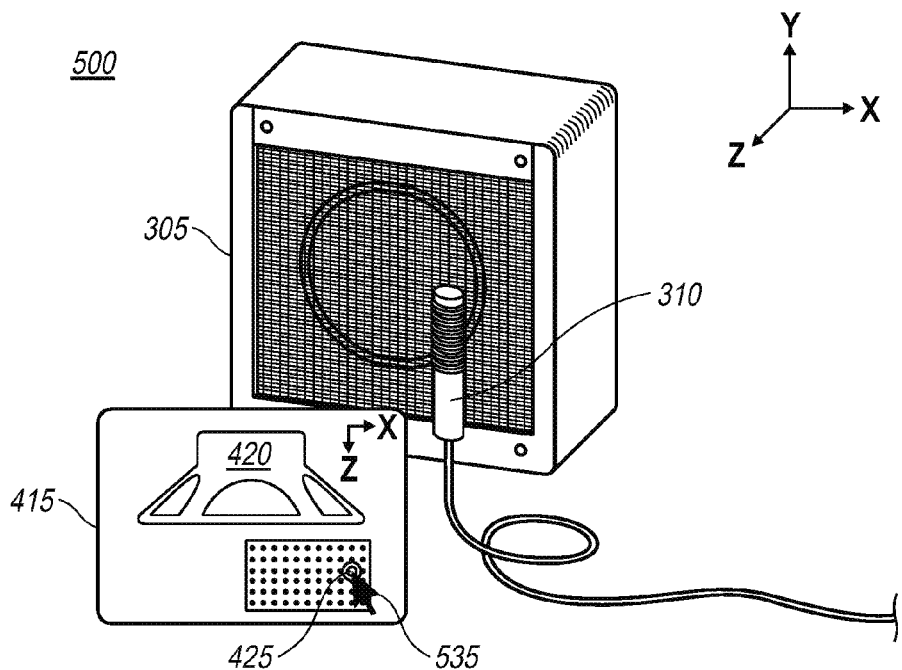
FIG. 5 depicts a screenshot of a GUI of a DAW displaying movement of a virtual sound capturing device on a graphical map in accordance with an exemplary embodiment.

FIG. 5 is a screen shot 500 of a portion of the GUI showing the virtual sound producing device 305 and the virtual sound capturing device 310, from FIG. 3, with graphical map 415 depicting a top down view of the top of virtual sound producing device 420 and the top of virtual sound capturing device 425, from FIG. 4, where virtual sound capturing device 425 has been moved to a second position 535. As can be seen in FIG. 5, the position of virtual sound capturing device 310 and the position of the top of virtual sound capturing device 425 have changed from their earlier positions. While only one virtual sound producing device and one virtual sound capturing device are shown, any number of each device can be depicted. Furthermore, each virtual sound capturing device can be individually adjusted.

Returning to FIG. 2, at block 220 the position of the virtual sound capturing device is chosen. For example, in response to a command received via the input device, the processor, processor module, and/or display module can cause the display device to show the chosen position of the virtual sound capturing device. Based on the chosen position of the virtual sound capturing device, an algorithm associated with an audio file can be adjusted to reflect the chosen position of the virtual sound capturing device in relation to the virtual sound producing device. Additionally, the algorithm associated with the audio file can be continuously adjusted as the virtual sound capturing device is moved in relation to the virtual sound producing device around the GUI.

Figure 6:
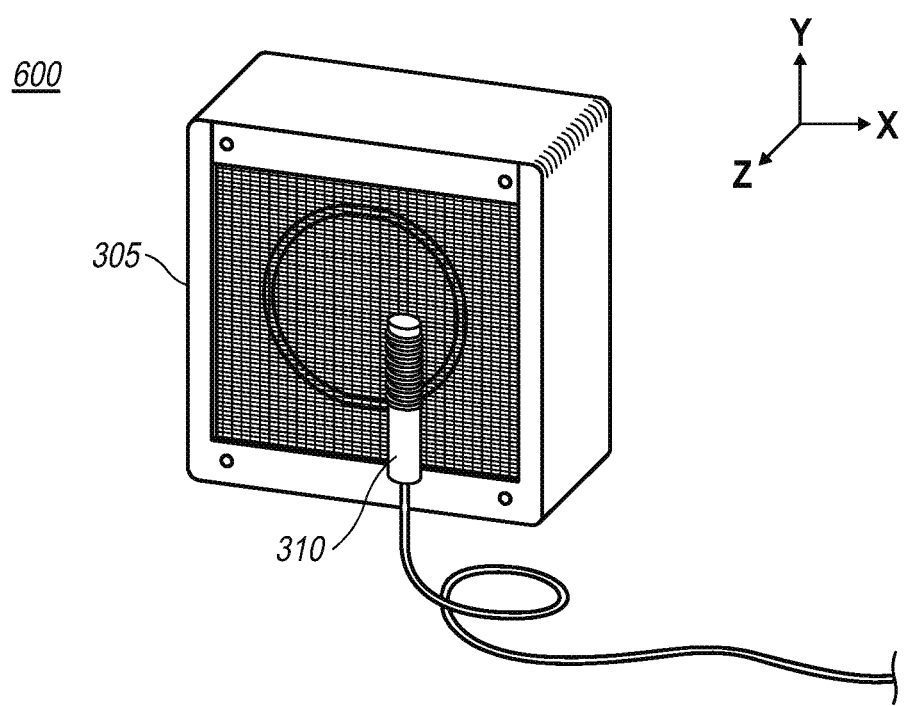
FIG. 6 depicts a screenshot of a GUI of a DAW displaying the chosen position of a virtual sound capturing device in accordance with an exemplary embodiment.

FIG. 6 is a screen shot 600 of a portion of the GUI showing virtual sound producing device 305 and virtual sound capturing device 310, from FIG. 3, with the position of the virtual sound capturing device moved to the chosen position. Furthermore, graphical map 415 has been removed.

The technology can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized and/or distributed as known to those skilled in the art.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

We claim:

1. A system for positioning a virtual sound capturing device, the system comprising:
   a processor; and
   a computer-readable medium storing instructions executable by the processor to perform operations comprising:
     displaying, on a display device, a virtual sound capturing device in relation to a virtual sound producing device in a two-dimensional graphical map;
     receiving input to adjust the display of the virtual sound capturing device in relation to the virtual sound producing device in the two-dimensional graphical map; and
     in response to receiving the input, adjusting an algorithm based on a model of a sound capturing device corresponding to the virtual sound capturing device and a model of a sound producing device corresponding to the virtual sound producing device.

2. The system of claim 1, wherein the operations further comprise:
   displaying multiple positions in the two-dimensional graphical map, each position representing a position at which the virtual sound capturing device can be positioned, wherein the input includes input to change a position of the virtual sound capturing device from a first position of the multiple positions to a second position of the multiple positions; and
   in response to receiving the input, changing the position of the virtual sound capturing device from the first position to the second position.

3. The system of claim 1, wherein adjusting the algorithm comprises adjusting the algorithm to reflect the adjustment to the display of the virtual sound capturing device in relation to the virtual sound producing device.

4. The system of claim 1, wherein displaying the virtual sound capturing device in relation to the virtual sound producing device comprises displaying an overhead view of the virtual sound capturing device and an overhead view of the virtual sound producing device.

5. The system of claim 1, wherein receiving the input to adjust the display of the virtual sound capturing device in relation to the virtual sound producing device in the two-dimensional graphical map comprises detecting, in the display device, a selection of the virtual sound capturing device and a movement of the virtual sound capturing device in relation to the virtual sound producing device.

6. The system of claim 1, wherein receiving the input to adjust the display of the virtual sound capturing device in relation to the virtual sound producing device in the two-dimensional graphical map comprises detecting, in the display device, a selection of the virtual sound producing device and a movement of the virtual sound producing device in relation to the virtual sound capturing device.

7. The system of claim 1, wherein receiving input to adjust the display of the virtual sound capturing device in relation to the virtual sound producing device in the two-dimensional graphical map comprises:
   receiving input, in the display device, to move the virtual sound capturing device in relation to the virtual sound producing device in the two-dimensional graphical map; and
   displaying a movement of the virtual sound capturing device in relation to the virtual sound producing device in the two-dimensional graphical map in response to receiving the input to move the virtual sound capturing device in relation to the virtual sound producing device.

8. A non-transitory computer-readable medium storing instructions executable by one or more processors to perform operations comprising:
   displaying, on a display device, a virtual sound capturing device in relation to a virtual sound producing device in a two-dimensional graphical map;
   receiving input to adjust the display of the virtual sound capturing device in relation to the virtual sound producing device in the two-dimensional graphical map; and in response to receiving the input, adjusting an algorithm based on a model of a sound capturing device corresponding to the virtual sound capturing device and a model of a sound producing device corresponding to the virtual sound producing device.

9. The medium of claim 8, wherein the operations further comprise:
displaying multiple positions in the two-dimensional graphical map, each position representing a position at which the virtual sound capturing device can be positioned, wherein the input includes input to change a position of the virtual sound capturing device from a first position of the multiple positions to a second position of the multiple positions; and
in response to receiving the input, changing the position of the virtual sound capturing device from the first position to the second position.

10. The medium of claim 8, wherein adjusting the algorithm comprises adjusting the algorithm to reflect the adjustment to the display of the virtual sound capturing device in relation to the virtual sound producing device.

11. The medium of claim 8, wherein displaying the virtual sound capturing device in relation to the virtual sound producing device comprises displaying an overhead view of the virtual sound capturing device and an overhead view of the virtual sound producing device.

12. The medium of claim 8, wherein receiving the input to adjust the display of the virtual sound capturing device in relation to the virtual sound producing device in the two-dimensional graphical map comprises detecting, in the display device, a selection of the virtual sound capturing device and a movement of the virtual sound capturing device in relation to the virtual sound producing device.

13. The medium of claim 8, wherein receiving the input to adjust the display of the virtual sound capturing device in relation to the virtual sound producing device in the two-dimensional graphical map comprises detecting, in the display device, a selection of the virtual sound producing device and a movement of the virtual sound producing device in relation to the virtual sound capturing device.

14. The medium of claim 8, wherein receiving input to adjust the display of the virtual sound capturing device in relation to the virtual sound producing device in the two-dimensional graphical map comprises:
receiving input, in the display device, to move the virtual sound capturing device in relation to the virtual sound producing device in the two-dimensional graphical map; and
displaying a movement of the virtual sound capturing device in relation to the virtual sound producing device in the two-dimensional graphical map in response to receiving the input to move the virtual sound capturing device in relation to the virtual sound producing device.

15. A computer-implemented method comprising:
displaying, on a display device, a virtual sound capturing device in relation to a virtual sound producing device in a two-dimensional graphical map;
receiving input to adjust the display of the virtual sound capturing device in relation to the virtual sound producing device in the two-dimensional graphical map; and
in response to receiving the input, adjusting an algorithm based on a model of a sound capturing device corresponding to the virtual sound capturing device and a model of a sound producing device corresponding to the virtual sound producing device.

16. The method of claim 15, further comprising:
displaying multiple positions in the two-dimensional graphical map, each position representing a position at which the virtual sound capturing device can be positioned, wherein the input includes input to change a position of the virtual sound capturing device from a first position of the multiple positions to a second position of the multiple positions; and
in response to receiving the input, changing the position of the virtual sound capturing device from the first position to the second position.

17. The method of claim 15, wherein adjusting the algorithm comprises adjusting the algorithm to reflect the adjustment to the display of the virtual sound capturing device in relation to the virtual sound producing device.

18. The method of claim 15, wherein displaying the virtual sound capturing device in relation to the virtual sound producing device comprises displaying an overhead view of the virtual sound capturing device and an overhead view of the virtual sound producing device.

19. The method of claim 15, wherein receiving the input to adjust the display of the virtual sound capturing device in relation to the virtual sound producing device in the two-dimensional graphical map comprises detecting, in the display device, a selection of the virtual sound capturing device and a movement of the virtual sound capturing device in relation to the virtual sound producing device.

20. The method of claim 15, wherein receiving the input to adjust the display of the virtual sound capturing device in relation to the virtual sound producing device in the two-dimensional graphical map comprises detecting, in the display device, a selection of the virtual sound producing device and a movement of the virtual sound producing device in relation to the virtual sound capturing device.

\* \* \* \* \*